United States Patent [19]
Eckhout

[11] Patent Number: 5,487,557
[45] Date of Patent: Jan. 30, 1996

[54] AIR BAG COVER HAVING AN APPLIQUE FASTENED THERETO AND METHOD OF MANUFACTURING SAME

[75] Inventor: Thomas L. Eckhout, Waterford, Mich.

[73] Assignee: Larry J. Winget, Leonard, Mich.

[21] Appl. No.: 140,594

[22] Filed: Oct. 20, 1993

[51] Int. Cl.⁶ .................................................. B60R 21/20
[52] U.S. Cl. ........................................................ 280/728.3
[58] Field of Search ........................... 280/728 B, 728 A, 280/731, 732, 728 R, 752, 728.3, 728.2, 728.1; 180/90; 296/70; 293/128; 428/31

[56] References Cited

U.S. PATENT DOCUMENTS

| 3,458,386 | 7/1969 | Shanok et al. | 428/31 |
|---|---|---|---|
| 4,139,664 | 2/1979 | Wenrick | 428/31 |
| 4,325,568 | 4/1982 | Clark et al. | 280/731 |
| 4,515,649 | 5/1985 | Nussbaum | 428/31 |
| 4,663,210 | 5/1987 | Schreiber et al. | 280/752 |
| 4,934,735 | 6/1990 | Embach | 280/731 |
| 5,085,462 | 2/1992 | Gualtier | 280/731 |
| 5,110,647 | 5/1992 | Sawada et al. | 280/728 B |
| 5,180,187 | 1/1993 | Muller et al. | 280/728 B |
| 5,186,490 | 2/1993 | Adams et al. | 280/731 |
| 5,226,998 | 7/1993 | Few | 293/128 |
| 5,294,147 | 3/1994 | Edge | 280/728 B |
| 5,369,232 | 11/1994 | Leonelli | 280/731 |
| 5,395,668 | 3/1995 | Ho et al. | 280/728 B |

FOREIGN PATENT DOCUMENTS

| 4113591 | 11/1991 | Germany | 280/728 B |
|---|---|---|---|
| 4035975 | 5/1992 | Germany | 280/728 B |
| 0171381 | 7/1990 | Japan | 280/731 |
| 0143752 | 6/1991 | Japan . | |
| 4151345 | 5/1992 | Japan | 280/728 B |
| 5024495 | 2/1993 | Japan | 280/728 B |
| 5139231 | 6/1993 | Japan | 280/728 B |
| 2252274 | 8/1992 | United Kingdom | 280/728 B |
| 2262488 | 6/1993 | United Kingdom | 280/728 B |

Primary Examiner—Margaret A. Focarino
Assistant Examiner—Peter C. English
Attorney, Agent, or Firm—Brooks & Kushman

[57] ABSTRACT

An automotive air bag cover is provided having a decorative applique fastened thereto. The air bag cover is manufactured from plastic and includes a front cover adapted to enclose an uninflated automotive air bag. The front cover includes an inner and outer surface. Side panels are further provided and are connected to and extend from the front cover. The decorative applique is fastened to the outer surface of the front cover. Seams are provided for permitting the air bag to inflate and exit the front cover. The decorative applique is fastened to the front cover adjacent the seams in a non-overlapping fashion such that the decorative applique does not interfere with exit or inflation of said air bag.

17 Claims, 4 Drawing Sheets

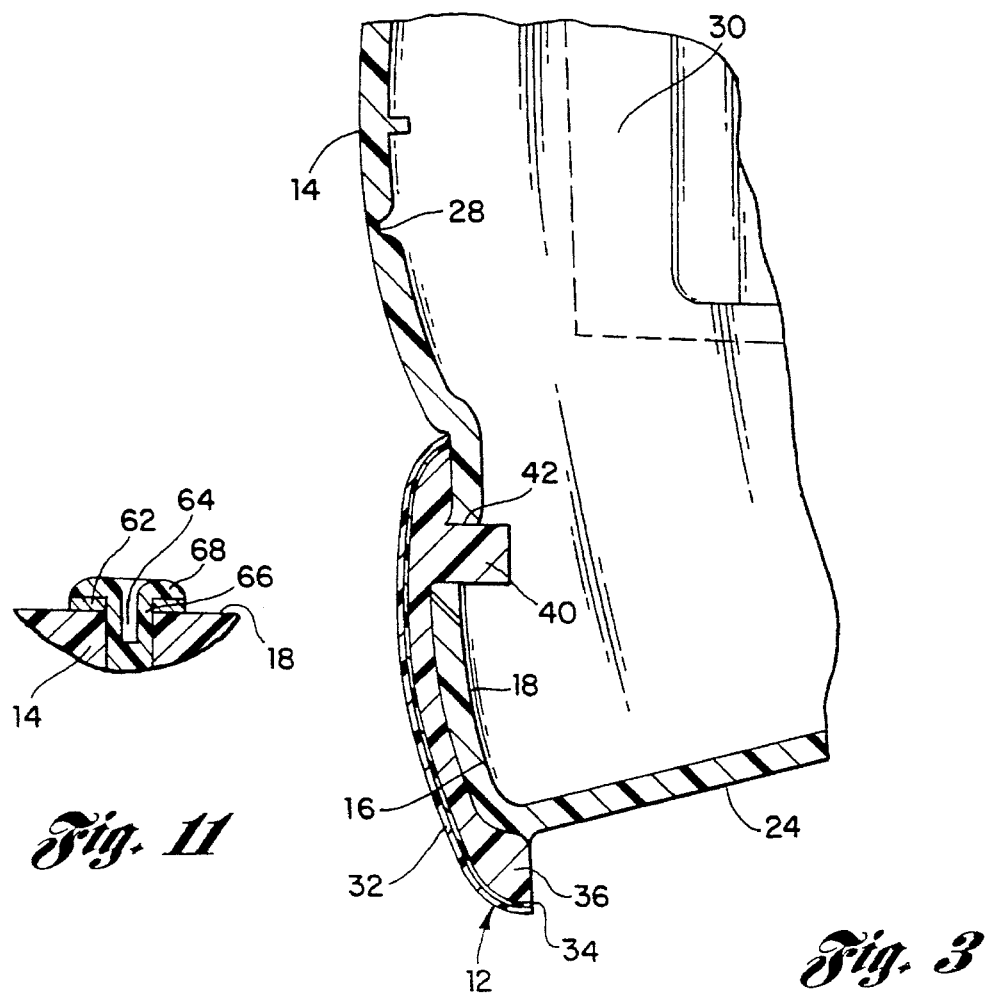
Fig. 11
Fig. 3
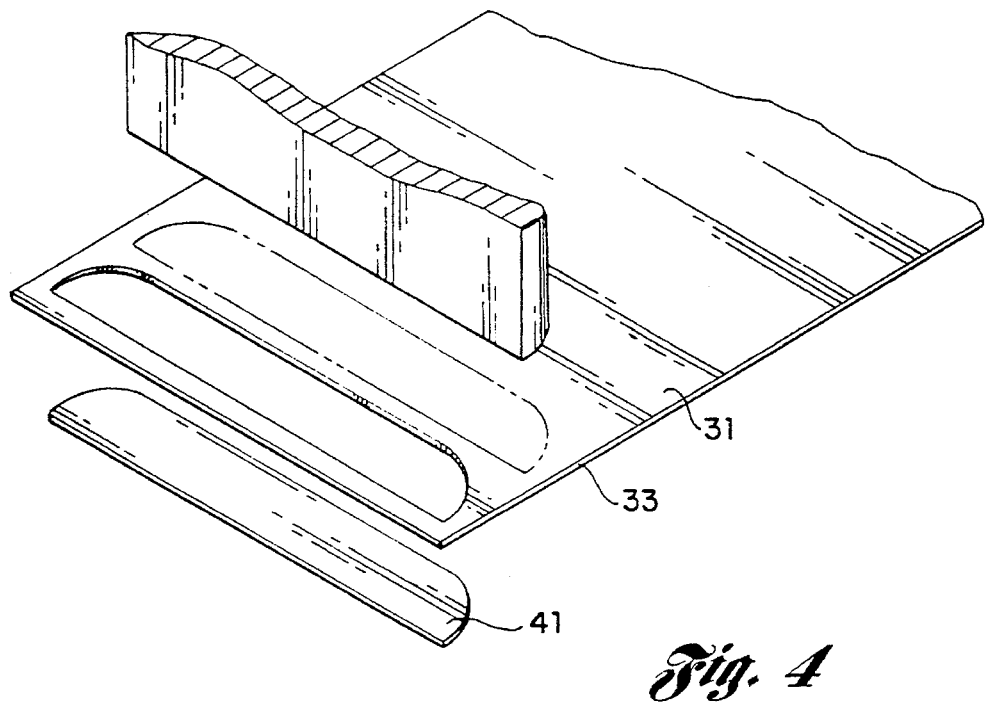
Fig. 4

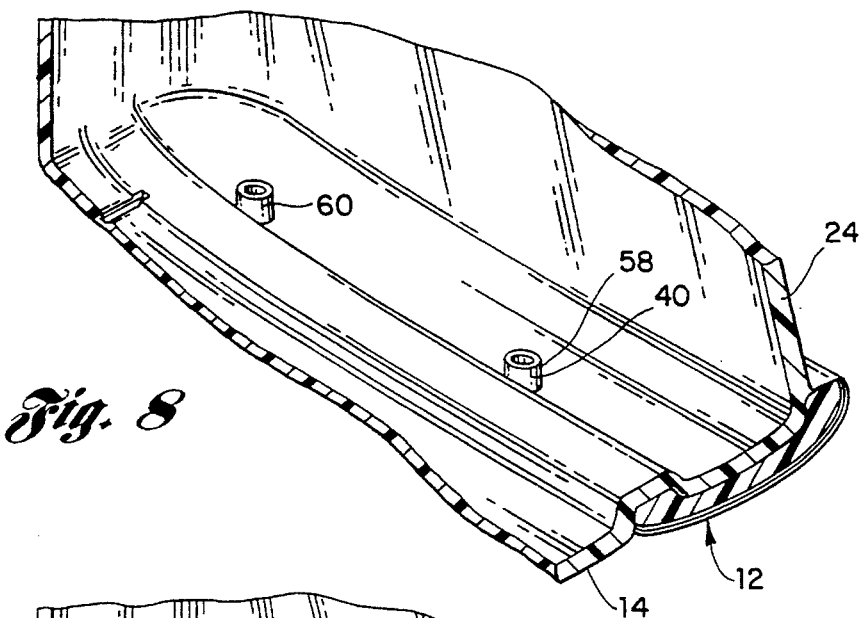
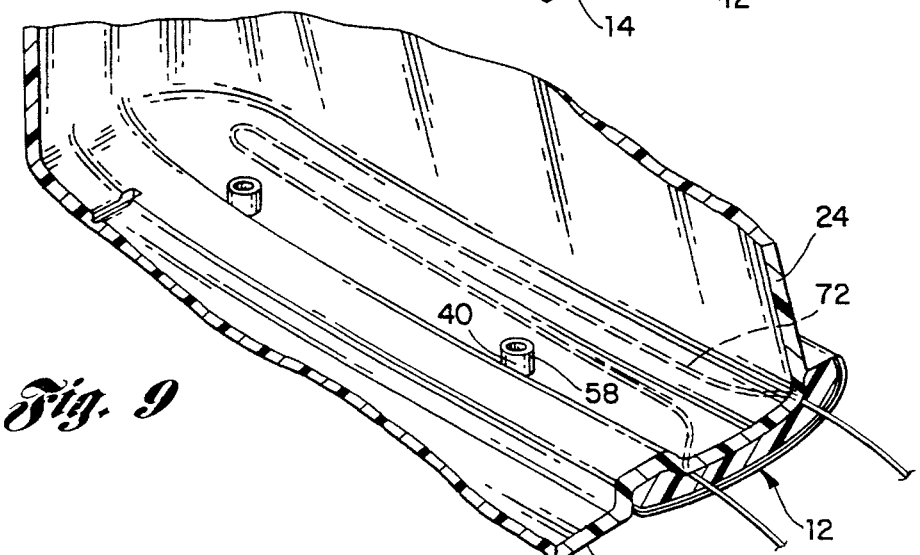
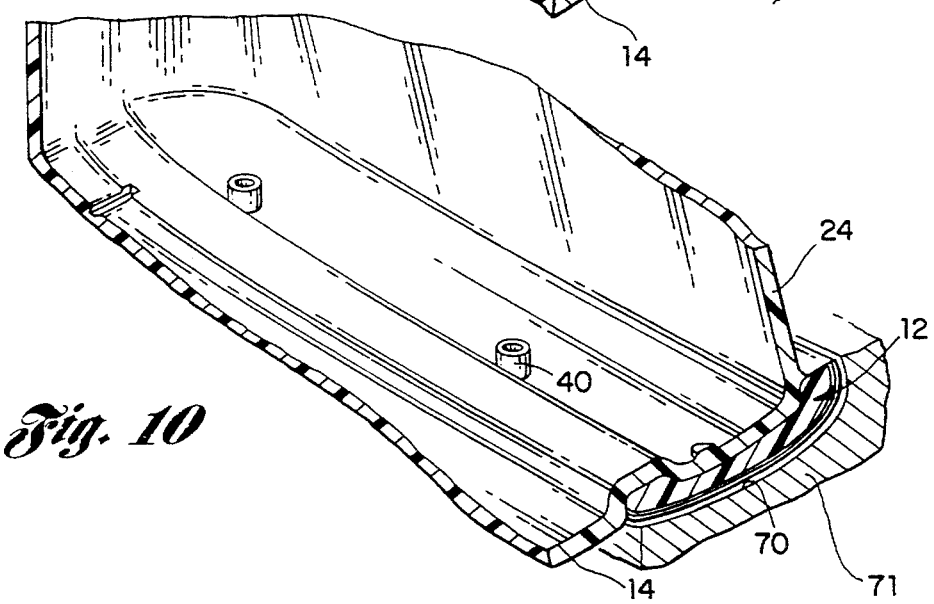

AIR BAG COVER HAVING AN APPLIQUE FASTENED THERETO AND METHOD OF MANUFACTURING SAME

This invention is related to co-pending applications Ser. Nos. 08/140,768 and 08/140,669 filed Oct. 20, 1993 and Oct. 21, 1993, respectively.

TECHNICAL FIELD

This invention relates to air bag covers having a decorative applique fastened thereto and to the methods of manufacturing same.

BACKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. It is known in other automotive parts areas that different, aesthetically pleasing outer surfaces enhance the overall appearance of the interior of automotive vehicles. Use of decorative appliques having solid colors contrasting or blending with the different colors of the plastic air bag covers is often sought after. Simulated wood grain finishes, and metallic finishes are also popular and economically feasible in combination with various plastic automotive parts.

Difficulties are known to arise in properly applying applique films to annular or arcuate plastic outer surfaces. Applique films are usually approximately 0.5 millimeters thick or less and are therefore not easily applied directly to an outer air bag cover surface. Improper application causes small air pockets to occur on the decorative film which often makes the resultant air bag cover, unattractive and thus unusable. Additionally, conventional air bag covers invariably include annular or arcuate surfaces, and affixing the thin applique film to these designated surfaces is even more difficult.

The deposition or fastening of the applique must be perfected with a method that affords a smooth surface and neat appearance. Thus it is known to utilize a backing material or liner in conjunction with a thin applique film to afford a clean, smooth appearance of the final product.

In addition, the applique must be affixed to the front cover in such a way as to prevent the applique from separating from the front cover when the air bag explodes. The applique must therefor be bonded to the front cover with sufficient strength to prevent fragmentation of the applique during air bag inflation and exit.

DISCLOSURE OF THE INVENTION

An object of the present invention is to provide an automotive air bag cover having a decorative applique attached thereto and a method of manufacturing same.

In carrying out the above objects and other objects of the present invention, an automotive air bag cover constructed in accordance with the present invention is provided. The air bag cover is manufactured from plastic and includes a front cover adapted to enclose an uninflated automotive air bag. The front cover includes an inner and outer surface. Side panels are further provided and are connected to the front cover. Seams are provided for permitting the air bag to inflate and exit the front cover. A decorative applique assembly is fastened to the outer surface of the front cover in a non-overlapping fashion with the seams. The decorative applique assembly is fastened to the front cover such that the decorative applique assembly does not detach from the front cover or interfere with exit or inflation of said air bag.

Preferably, the decorative applique assembly comprises a decorative film fastened to a plastic liner forming a decorative applique member shaped correspondingly to an outer arcuate surface portion of the air bag cover. Also, preferably, the decorative applique includes a plastic base fastened to the plastic liner.

A method of applying a decorative applique to an air bag cover is also provided including the following steps, providing an air bag cover having a seam, providing a decorative applique film segment, providing a plastic liner having a first surface and a second surface, providing a plastic base, securing the decorative applique to the first surface of the plastic liner, securing the plastic base to the second surface of the plastic liner to form a decorative applique assembly, securing the decorative applique assembly to the air bag cover in a non-overlapping fashion with the seams such that the plastic base will not detach from said air bag cover when the uninflated air bag inflates and exits the air bag cover.

These and other features and additional objects of the invention will occur to those skilled in the art on reading the following description with reference to the accompanying drawings.

BRIEF DESCRIPTION OF THE DRAWINGS

FIG. 3 is a cross sectional view of the air bag cover of the present invention taken along lines 3—3 of FIG. 2;

FIG. 4 is a perspective view illustrating a sheet of decorative applique material of the present invention being die cut into predetermined shapes;

FIG. 8 is a fragmentary, cross sectional view of an applique assembly attached to an air bag cover by a hot/cold upset method of the present invention;

FIG. 9 is a fragmentary, cross sectional view of an applique assembly attached to an air bag cover by an thermal, pressurized method of the present invention;

FIG. 10 is a fragmentary, cross sectional view of an applique assembly attached to an air bag cover by an in-mold decorating method of the present invention;

FIG. 11 is a cross section view of an alternative embodiment of the applique assembly attached to the air bag cover illustrating use of a washer plate.

BEST MODE FOR CARRYING OUT THE INVENTION

Figure 1:
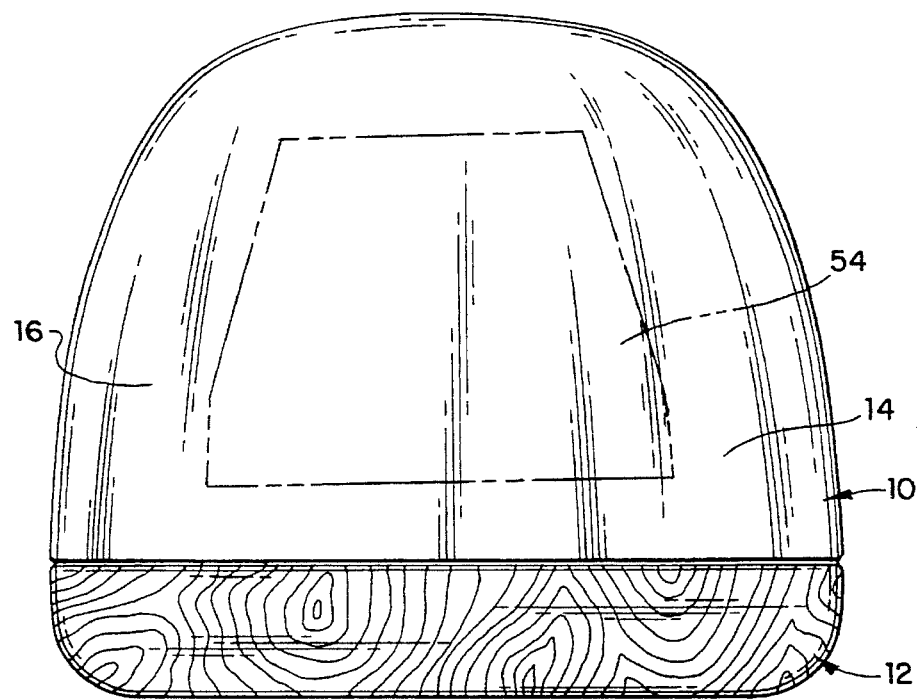
FIG. 1 is a front elevational view of an air bag cover constructed in accordance with the present invention.
Figure 2:
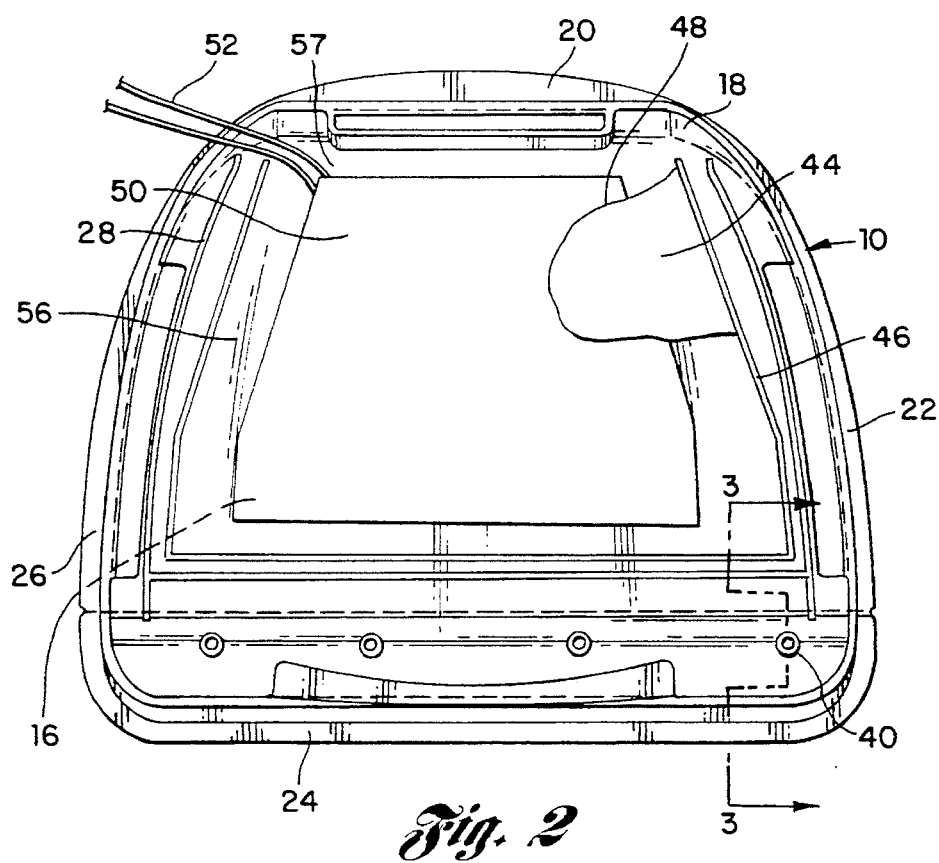
FIG. 2 is a rear elevational view of an air bag cover of the present invention.

Referring now to the drawing figures, and in particular to FIGS. 1 and 2, an air bag cover constructed in accordance with the present invention is generally shown at 10. The cover 10 includes a decorative applique assembly 12 affixed thereon. The applique assembly 12 is shown in FIG. 1 affixed to a front cover 14. The front cover 14 has an arcuate outer surface 16 and an inner surface 18. The side panels 20, 22, 24 and 26 extend from the front cover 14, respectively. It is preferred that the air bag cover 10 is manufactured from a flexible thermoplastic material such as commercially available "Santoprene" 201-87 provided by Advanced Elastomers Systems of Auburn Hills, Mich.

A "U" shaped continuous seam 28 is shown in FIG. 2 extending around the outer perimeter of the inner surface 18 of air bag cover 10. An uninflated air bag 30 is shown directly adjacent inner surface 18 in FIG. 3. The air bag cover 10 is designed to enclose uninflated air bag 30 and is usually positioned upon the steering wheel (not shown) of the automotive vehicle.

Figure 5:
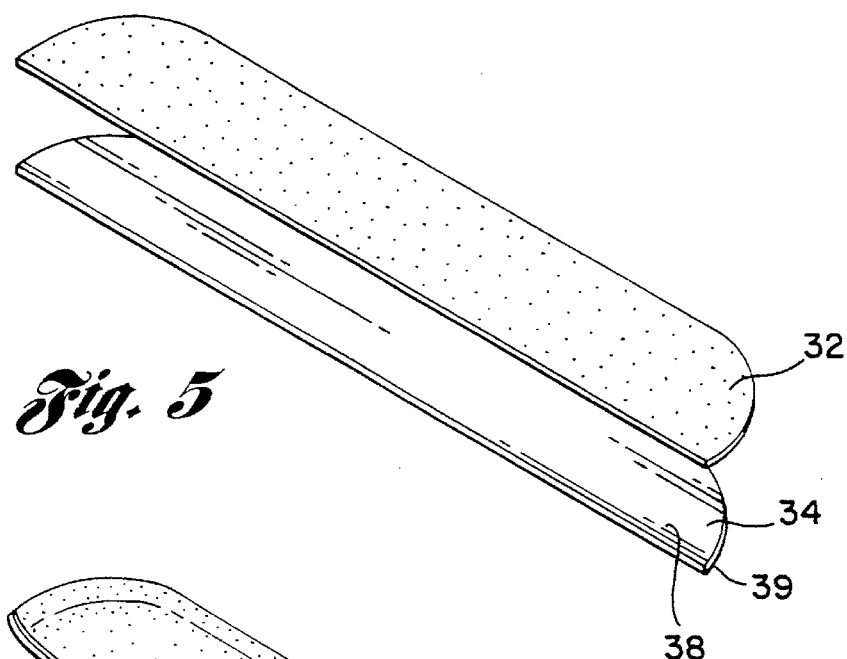
FIG. 5 is a perspective view illustrating the applique film and plastic liner of the present invention.

Referring now to FIG. 5 there is shown a decorative applique membrane or film 32 and a plastic liner 34. The present invention contemplates use of most contemporary decorative appliques including wood grain simulations, chromed or silvered appliques and textured appliques. The decorative applique film 32 is a thin membrane having a thickness of less than 0.5 millimeters. The plastic liner secured to the decorative applique is approximately 0.5 millimeters thick. The plastic liner 34 is extruded onto the decorative applique film 32 in a conventional manner as shown in FIG. 4 to form a sheet of decorative material 35 having a top layer 31 of decorative material and bottom layer 33 of plastic liner.

The plastic liner 34 is die cut into predetermined shapes as shown in FIG. 4. The predetermined shapes or decorative applique members 41 are vacuum formed into a shape corresponding to an arcuate portion of the air bag cover. The decorative applique member 41 is insert molded with a plastic base 36 to form the decorative applique assembly 12. The plastic base 36 is made of the same plastic material as air bag cover 10. Plastic liner 34 is similarly made of the same material as the air bag cover or from an AVS plastic material.

The plastic base 36 includes a plurality of connecting towers 40 located on one side thereof. As shown in FIGS. 2 and 3, these connecting towers are positioned correspondingly to fastening apertures 42 which extend completely through the front cover of the air bag cover 10.

Referring now to FIG. 2, there is shown a rear panel 44 having an outer attachment seam 46. Rear panel 44, in conjunction with outer seam 46 forms a hollow compartment 48. Rear panel 44 may be hot plate welded, heat staked or otherwise attached to the inner surface 18 of front cover 14. Rear panel 44 does not cover or overlap seam 28 since this may hinder or possibly prevent separation of the front cover at seam 28 upon inflation of the air bag.

The hollow compartment 48 houses a switch assembly 50 including electrical leads 52. Switch assembly 50 includes a pair of spaced electrically conductive surfaces each connected to one electrical lead 52 and an insulating layer (not shown), therebetween as illustrated in co-pending application Ser. No. 7/984,326 filed Dec. 2, 1992.

As known in the art, electrical leads 52 are connected to the automobile electrical system for providing current to the switch assembly upon actuation of the switch assembly from the outer surface of the front cover system. In other words, the switch assembly 50 operates in a conventional pressure sensitive manner by closing the circuit path formed by the electrical leads and the conductive surfaces by manual actuation of a corresponding portion of the front cover 14.

The corresponding front cover portion or activation section 54, is shown in phantom in FIG. 1. Switch assembly 50 in combination with air bag cover 10 allows pressure sensitive operation of an automotive horn or other electrically controllable device.

Referring back to FIGS. 1 and 2, decorative applique assembly 12 is shown affixed to air bag cover 10. The decorative applique assembly 12 is disposed adjacent seam 28 in a non-overlapping fashion to prevent any interference of assembly 12 with inflation or exit of the air bag upon operation. The decorative applique assembly 12 is therefore located, as illustrated in FIG. 2, sufficiently below seam 28 such that the attendant explosive effect that occurs upon inflation and exit of the air bag will move separable front cover section 56 away from decorative applique assembly 12. A flap segment 57 acts as a live hinge when air bag inflation and exit occurs.

It is known that decorative appliques enhance the appearance of conventional automotive parts. Air bag covers are currently designed to accommodate the overall appearance of the inside of the particular automobile. In furtherance of improving the aesthetic appeal of air bag covers, the present invention combines the pleasing visual characteristics of decorative appliques with the functional aspects of air bag covers. FIG. 1 illustrates air bag cover 10 including a simulated wood grain decorative applique 12. Simulated wood grain applique 12 is bonded to a decorative applique assembly as discussed in detail above.

Air bag cover 10 provides a decorative appearance by the addition of the decorative applique 12 without effecting the operable conditions of the air bag cover. The decorative applique assembly, including the decorative applique is affixed to the air bag cover with sufficient strength and at a location such that the assembly will not affect the inflation and subsequent exit of the inflating air bag from the cover. Applique film 32 is bonded to plastic liner by the extrusion process such that the applique film will not separate from the plastic liner 34 during air bag inflation. Similarly, insert molding the decorative applique member to the plastic base also insures that no fragmentation of the decorative applique assembly will occur during air bag inflation.

Attention is now directed to the various alternative methods of manufacturing the air bag of the present invention. Referring now FIGS. 2, 5, 6 and 7, the method includes providing an air bag cover 10 having a seam 28, a decorative applique film segment 32, a plastic liner 34 having a first surface 38 and a second surface 39 and a plastic base 36.

Figure 6:
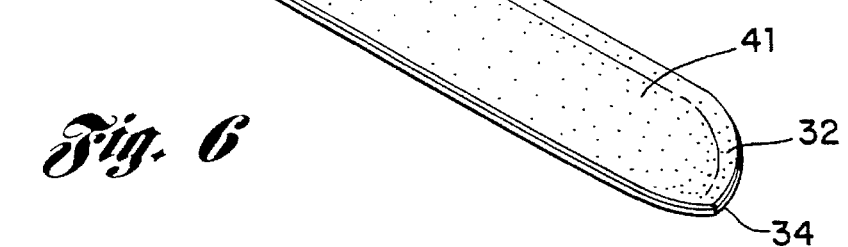
FIG. 6 is a perspective view of the applique film and plastic liner vacuum formed and bonded together.
Figure 7:
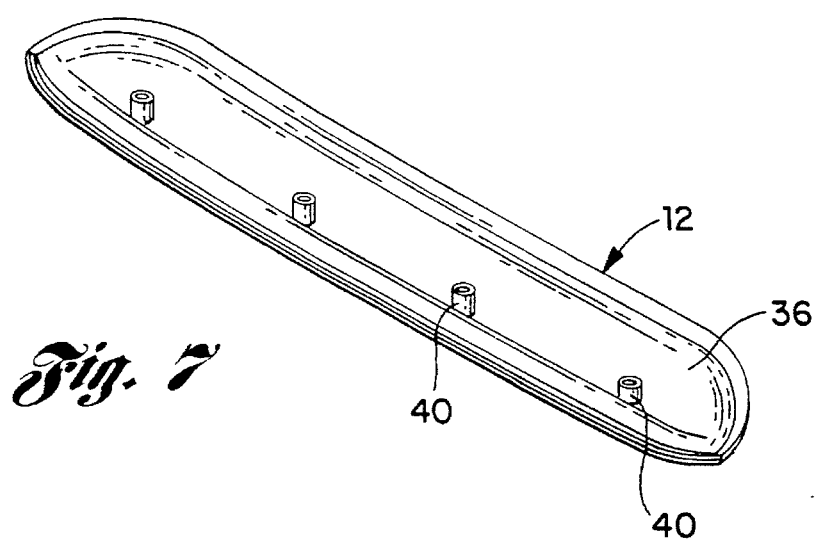
FIG. 7 is a perspective view of the applique assembly of the present invention illustrating connecting towers.

Referring to FIGS. 4, 5, and 6, the preferred method includes providing a sheet of decorative applique film (not shown). A plastic liner liner 34 is extruded directly onto the decorative applique film to form a sheet of decorative applique material 35. Specifically, the sheet of decorative applique material is extruded through a die having a thin slit (not shown) and then a heated plastic material is extruded directly onto the applique material, bonding the two surfaces together. This conventional extrusion process secures the first surface 38 of the plastic liner 34 to the decorative applique film.

Decorative applique material 35 is next die cut into a predetermined shape forming a decorative applique member 41. The decorative applique member is then conventionally vacuum formed into a shape corresponding to an arcuate portion 16 of the air bag cover 10. The decorative applique member is finally placed in an article defining cavity of a mold (not shown) shaped correspondingly to plastic base 36. Plastic is next injected into the mold cavity and decorative applique member is thereby insert molded with plastic base 36 to form decorative applique assembly 12.

The decorative applique assembly 12 is finally secured to the air bag cover 10 in a non-overlapping fashion with the seam 28 such that the plastic base 36 will not detach from the air bag cover when the uninflated air bag inflates and exits the air bag cover.

Referring now to FIG. 8, an alternative method includes the steps of providing an air bag cover 10 having a seam 28 and at least one fastening aperture 42, a decorative applique film segment 32, a plastic liner 34 having a first surface 38 and a second surface 39 and a plastic base 36 having a connecting tower 40. As described above, the decorative applique film segment 32 is secured to the first surface 38 of the plastic liner 34 as described above.

The plastic base 36 is then secured to the second surface 39 of the plastic liner to form the decorative applique assembly 12. The decorative applique assembly 12 is attached to the air bag cover 10 in a non-overlapping fashion with the seam 28 such that the plastic base 36 will not detach from the air bag cover when the uninflated air bag inflates and exits the air bag cover. The decorative applique assembly is attached to the air bag cover 10 by inserting connecting tower 40 through fastening aperture 42 such that a portion 58 of the connecting tower extends out from the fastening aperture 42.

The portion 58 is then deformed to form a retaining member 60 larger in diameter than the fastening aperture 42, thereby affixing the applique to the air bag cover. The preferred method of deforming includes the steps of applying a stream of heated air to portion 58 to melt the portion and applying a cold stake directly to melted portion 58 to form retaining member 60. The process of using hot air in conjunction with a relatively cool, fixed, die or stake is known in the art as a "hot-cold upset" manufacturing method.

Referring to FIG. 11, yet another alternative method includes all the preceding steps and further includes providing a washer plate 62 having a central aperture 64 extending therethrough. The washer plate is then placed onto the connecting tower such that the a second portion 66 of the connecting tower extends through the central aperture 64 and the washer plate encircles the connecting tower. The second portion 66 of the connecting tower is then heated until portion 66 melts onto washer plate 62 to form a retaining button 68.

Referring to FIG. 10, a further method of applying the decorative applique comprises insert molding the decorative applique of the present invention onto the air bag cover. The decorative applique assembly 12 is first made in accordance with the method described above. The decorative applique assembly 12 is next placed in the article defining cavity 70 of a mold 71. The mold 71 is shaped correspondingly to the shape of the air bag cover 10. A plastic material is injected into cavity 70 around decorative applique assembly 12 thereby molding the decorative applique in place and fastening the applique to the now molded air bag cover 10.

A still further method of fastening the decorative applique to the air bag cover is shown in FIG. 9. The method comprises the steps of providing the air bag cover 10 with at least one fastening aperture 42 extending therethrough, a plastic base 36 with at least one connecting tower 40 and an electrical conductor 72 disposed between the decorative applique assembly 12 and the air bag cover 10. The decorative applique assembly is attached to the air bag cover by inserting the connecting tower 40 through the fastening aperture 42 such that a portion of said connecting tower 58 extends from the fastening aperture 42.

A pressure of approximately 5 to 15 pounds per square inch is then applied to the decorative applique assembly 12 and the air bag cover 10. An electrical current is applied to the electrical conductor thereby heating the conductor and bonding the decorative applique assembly 12 to the air bag cover 10. The conductor is heated to a temperature in a range from 300 to 500 degrees fahrenheit for approximately 2 to 5 seconds to adequately melt the abuttingly engaged portions of the decorative assembly 12 and air bag cover 10. The pressure is applied prior to heating the conductor, throughout the heating process, and for a short time after the electrical current is terminated. The pressure is applied for approximately a total of 8 seconds.

While only certain embodiments of the method and apparatus of the present invention have been shown and described, others may be possible without departing from the scope of the following claims.

I claim:

1. An automotive air bag cover comprising:

a front cover adapted to enclose an uninflated automotive air bag, the front cover having an inner surface and an outer surface, said outer surface further having an arcuate portion;

a seam formed in a surface of the cover for permitting the air bag to deploy; and a decorative applique assembly permanently fastened over its area of exposure to a selected portion of said outer surface of said front cover in a non-overlapping fashion with said seam such that said decorative applique assembly does not detach from the front cover or interfere with said air bag upon inflation and exit of said air bag, said decorative applique assembly having a plastic liner and a decorative film fastened to a first surface of the plastic liner, the plastic liner and decorative film being shaped correspondingly to said arcuate portion of said outer surface, and said decorative applique assembly further having a plastic base attached to a second surface of said plastic liner to form said decorative applique assembly.

2. An automotive air bag cover as in claim 1 wherein said decorative film is less than 0.5 millimeters thick and said plastic liner is 0.3 to 0.6 millimeters thick.

3. An automotive air bag cover as in claim 1 wherein said plastic base includes at least one connecting tower cooperable with a receiving aperture extending through said front cover for receiving the tower and fastening said decorative applique assembly to said front cover.

4. An automotive air bag cover as in claim 3 further comprising an electrical conductor disposed between said plastic base and said front cover, wherein said electrical conductor is adapted to receive an electric current for generating heat sufficient to bond the plastic base and outer surface of said air bag cover together.

5. An automotive air bag cover as in claim 1 wherein each of said decorative film, plastic liner and plastic base have a uniform thickness.

6. A method of applying a decorative applique to an air bag cover adapted to enclose an uninflated air bag, said method comprising the steps of:

providing an air bag cover having a seam;

providing a decorative applique film segment;

providing a plastic liner having a first surface and a second surface;

providing a plastic base;

securing said decorative applique film segment to the first surface of said plastic liner;

securing said plastic base to the second surface of said plastic liner to form a decorative applique assembly;

permanently securing said decorative applique assembly onto a selected portion of said air bag cover in a non-overlapping fashion with said seam such that said plastic base will not detach from said air bag cover when said uninflated air bag inflates and exits said air bag cover.

7. A method as in claim 6 further comprising the steps of:

providing a sheet of decorative applique film;

extruding said plastic liner directly onto said applique film to form a sheet of decorative material having a top layer of decorative applique film and a bottom layer of plastic liner;

cutting said sheet of decorative material to form a decorative applique member;

vacuum forming said decorative applique member into a shape corresponding to an arcuate portion of said air bag cover; and insert molding said decorative applique member with said plastic base to form said decorative applique assembly.

8. A method as in claim 6 further comprising the step prior to securement of the assembly to the air bag cover of:

aligning the decorative applique assembly with respect to the air bag cover.

9. A method as in claim 6 further comprising the steps of:

providing said air bag cover with at least one fastening aperture extending therethrough;

providing said plastic base with at least one connecting tower;

attaching said decorative applique assembly to said air bag cover by inserting said at least one connecting tower through said at least one fastening aperture such that a portion of said connecting tower extends from said fastening aperture; and deforming said portion of said tower to form a retaining member larger in diameter than said fastening aperture thereby affixing said decorative applique assembly to said air bag cover.

10. A method as in claim 9 wherein said step of deforming comprises the steps of:

applying a stream of heated air to said portion of said connecting tower to melt said portion; and applying a cold stake directly to said portion to form said retaining member.

11. A method as in claim 9 further comprising the steps of:

encircling said connecting tower with a washer plate having a central aperture extending therethrough such that a second portion of said connecting tower extends through both said fastening aperture and said central aperture of said washer plate; and heating said second portion such that said second portion melts onto said washer plate to form a retaining button.

12. A method as in claim 6 wherein the step of securing said decorative applique assembly comprises the steps of:

inserting said decorative applique assembly into an article defining cavity of a mold corresponding to the shape of said air bag cover; and injecting a charge of plastic sufficient to form the air bag cover into said cavity thereby integrally molding said decorative applique assembly onto said air bag cover.

13. A method as in claim 6 further comprising the steps of:

providing said air bag cover with at least one fastening aperture extending therethrough;

providing said plastic base with at least one connecting tower;

providing an electrical conductor between said decorative applique assembly and said air bag cover;

attaching said decorative applique assembly to said air bag cover by inserting said at least one connecting tower through said at least one fastening aperture such that a portion of said connecting tower extends from said fastening aperture;

applying pressure to said decorative applique assembly and said air bag cover; and applying electrical current to said electrical conductor thereby heating said conductor and bonding said decorative applique assembly to said air bag cover.

14. A method as in claim 13 wherein said step of applying pressure to said decorative applique assembly and said air bag cover comprises applying an engagement pressure of approximately 5 to 15 pounds per square inch to said air bag cover and said decorative applique assembly and said step of applying electrical current includes applying an electrical current sufficient to raise said conductor to a temperature in a range from approximately 300 to 500 degrees fahrenheit.

15. A method as in claim 14 wherein said pressure is applied for at least 2 seconds.

16. A method as in claim 14 wherein said electrical current is applied to said electrical conductor for at least 2 seconds.

17. A method as in claim 14 wherein said pressure is applied simultaneously with said electrical current.

* * * * *